(12) United States Patent
Russell

(10) Patent No.: US 7,093,858 B1
(45) Date of Patent: Aug. 22, 2006

(54) TRACER WIRE SNAP CLAMP

(76) Inventor: Jim L. Russell, 3707 E. 66th, Tulsa, OK (US) 74136

(*) Notice: Subject to any disclaimer, the term of this patent is extended or adjusted under 35 U.S.C. 154(b) by 55 days.

(21) Appl. No.: 10/855,762

(22) Filed: May 27, 2004

Related U.S. Application Data

(63) Continuation of application No. 09/783,047, filed on Feb. 12, 2001, now abandoned.

(51) Int. Cl.
    *F16L 3/22* (2006.01)
(52) U.S. Cl. .................. 285/28; 285/24; 285/921; 248/74.2; 248/68.1; 29/890.14
(58) Field of Classification Search ............ 285/124.2, 285/28, 24, 921; 248/62, 68.1, 69, 74.2; 29/890.14, 282, 237
    See application file for complete search history.

(56) References Cited

U.S. PATENT DOCUMENTS

| | | | | |
|---|---|---|---|---|
| 1,519,018 A | * | 12/1924 | Boudreau | 285/124.2 |
| 2,303,108 A | | 11/1942 | Blackburn | |
| 2,803,050 A | | 8/1957 | Fernberg | |
| 3,211,828 A | * | 10/1965 | Cloud, Jr. | 174/72 A |
| 3,803,345 A | * | 4/1974 | Speath, Jr. | 174/149 R |
| 3,893,647 A | * | 7/1975 | Kennedy | 248/68.1 |
| 4,018,459 A | | 4/1977 | Mominee et al. | |
| 4,420,654 A | | 12/1983 | Muller | |
| 4,675,512 A | * | 6/1987 | Doucet et al. | 219/535 |
| 5,331,725 A | | 7/1994 | Chou | |
| 5,474,268 A | * | 12/1995 | Yu | 248/61 |
| 5,803,654 A | * | 9/1998 | Spease et al. | 403/384 |
| 6,073,891 A | | 6/2000 | Humber | |
| 6,164,604 A | | 12/2000 | Cirino et al. | |
| 6,241,199 B1 | | 6/2001 | Ismert | |
| 6,513,765 B1 | * | 2/2003 | Griffin et al. | 248/68.1 |

OTHER PUBLICATIONS

Wire Guard—Tracer Wire Retainer Bracket—advertisement from the Internet at www.nwutilityproducts.com.
Military Standardization Handbook, Plastics; Department of Defense, MIL-HDBK-700 (MR), Nov. 1965.

* cited by examiner

*Primary Examiner*—David Bochna
(74) *Attorney, Agent, or Firm*—Frank J. Catalano

(57) ABSTRACT

A clamp for attaching a pipeline tracer wire to a pipeline riser has an elongated riser grip which is resiliently flexible to snap onto the riser. An elongated conduit with a V-shaped groove extends integrally along the outer wall of the riser grip. The conduit receives the tracer wire therein. At least one tap screw is engagable in the groove and radially into the conduit to lock the tracer wire between the screw and the opposite inner wall of the conduit. Alternatively, a tap screw may be threadedly engaged in the upper end of the conduit to lock the tracer wire between the screw and the opposite inner wall of the conduit. Preferably, the clamp is made of non-metallic, fire retardant material such as a high density thermoplastic.

18 Claims, 3 Drawing Sheets

TRACER WIRE SNAP CLAMP

This application is a continuation of application Ser. No. 09/783,047, filed Feb. 12, 2001 now abandoned.

BACKGROUND OF THE INVENTION

This invention relates generally to underground pipeline locating equipment and more particularly concerns a snap clamp for holding a pipeline tracer wire in place at a pipeline riser.

In order to facilitate the location of an underground nonmetallic pipeline such as may be used, for example, in a gas service line, a metallic tracer wire is buried with the nonmetallic pipe. The use of tracer wire is especially desirable in more modern code installations which require that the pipeline be installed in a snake-like path so as to minimize pipeline damage resulting from seasonal freezing and thawing. While the beginning and end points of such a line are readily determinable, the pipeline path itself is random and unpredictable.

The present practice with tracer wires is to extend the riser end of the wire above ground near the riser pipe and to tape, tie or clamp the wire above ground to a suitable fixture near the riser. This is frequently done with a small metal clamp located above ground so that the tracer wire extends upwardly in an exposed condition from the ground to the clamp. Recently, plastic clamps have been used for the purpose, but the tracer wire remains exposed. As a result, the clamp and the tracer wire are exposed to damage by lawn tools such as weedeaters and lawnmowers so that even properly mounted tracer wires can be damaged or lost. One such clamp has serially arranged pipe gripping segments of decreasing size or diameter so that the clamp is adaptable to a variety of pipe outer diameters. This further compounds the problem since the clamp holds the wire outwardly from the fixture to which it is attached. In addition to possible damage by lawn tools, the metal clamps are subject to corrosion and deterioration. The cathodic affect of the combination of metal clamps with tracer wires increases the possibility of corrosion. Furthermore, the exposed tracer wire, as well as the totally above ground and outwardly extending clamp, are an invitation to innocent and not-so-innocent observers.

It is, therefore, an object of this invention to provide a tracer wire snap clamp which facilitates attaching a pipeline tracer wire to a riser. Another object of this invention is to provide a tracer wire snap clamp which simplifies tracer wire installation. A further object of this invention is to provide a tracer wire snap clamp which holds the tracer wire in close proximity to the riser. Yet another object of this invention is to provide a tracer wire snap clamp which encases the entire length of tracer wire extending above the ground. It is also an object of this invention to provide a tracer wire snap clamp which protects the tracer wire from damage by contact with yard tools such as weedeaters and lawn mowers. Still another object of this invention is to provide a tracer wire snap clamp which reduces the possibility of the tracer wire being lost and resulting need for digging for the tracer wire or pipeline. An additional object of this invention is to provide a tracer wire snap clamp which will not corrode or deteriorate in the field. Another object of this invention is to provide a tracer wire snap clamp which reduces the possibility of corrosion or deterioration of the tracer wire. A further object of this invention is to provide a tracer wire snap clamp which blends into the riser environment so as not to attract attention. Yet another object of this invention is to provide a tracer wire snap clamp which is easily located.

SUMMARY OF THE INVENTION

In accordance with the invention, a clamp is provided for attaching a pipeline tracer wire to a pipeline riser. An elongated riser gripping member has a C-shaped circular cross-section. The cross-section has a diameter not less than an outer diameter of the riser and a perimeter extending more than 180 degrees to a chordal opening of length less than the outer diameter of the riser. The gripping member is resiliently flexible to snap onto the riser. An elongated tubular member having a bore of circular cross-section extends integrally along the outer wall of the riser gripping member. A V-shaped groove extends along the length of the tubular member. The bore diameter is greater than the outer diameter of the tracer wire so as to be able to receive the tracer wire therein. At least one tap screw is engagable in the groove and radially into the tubular member to lock the tracer wire between the screw and the opposite inner wall of the tubular member. Alternatively, a tap screw may be threadedly engaged in the upper end of the bore to lock the tracer wire between the screw and the opposite inner wall of the tubular member. Preferably, the tubular member has a longitudinal axis which is diametrically opposite a midpoint of the chordal opening and a second V-shaped groove extends along the length of the tubular member. The grooves are diametrically opposed on the tubular member on a diameter of the tubular member which is perpendicular to the radius of the gripping member which extends toward the longitudinal axis of the tubular member. Preferably, the clamp is made of non-metallic material such as a high density thermoplastic which is a fire-retardant, self-extinguishing material.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
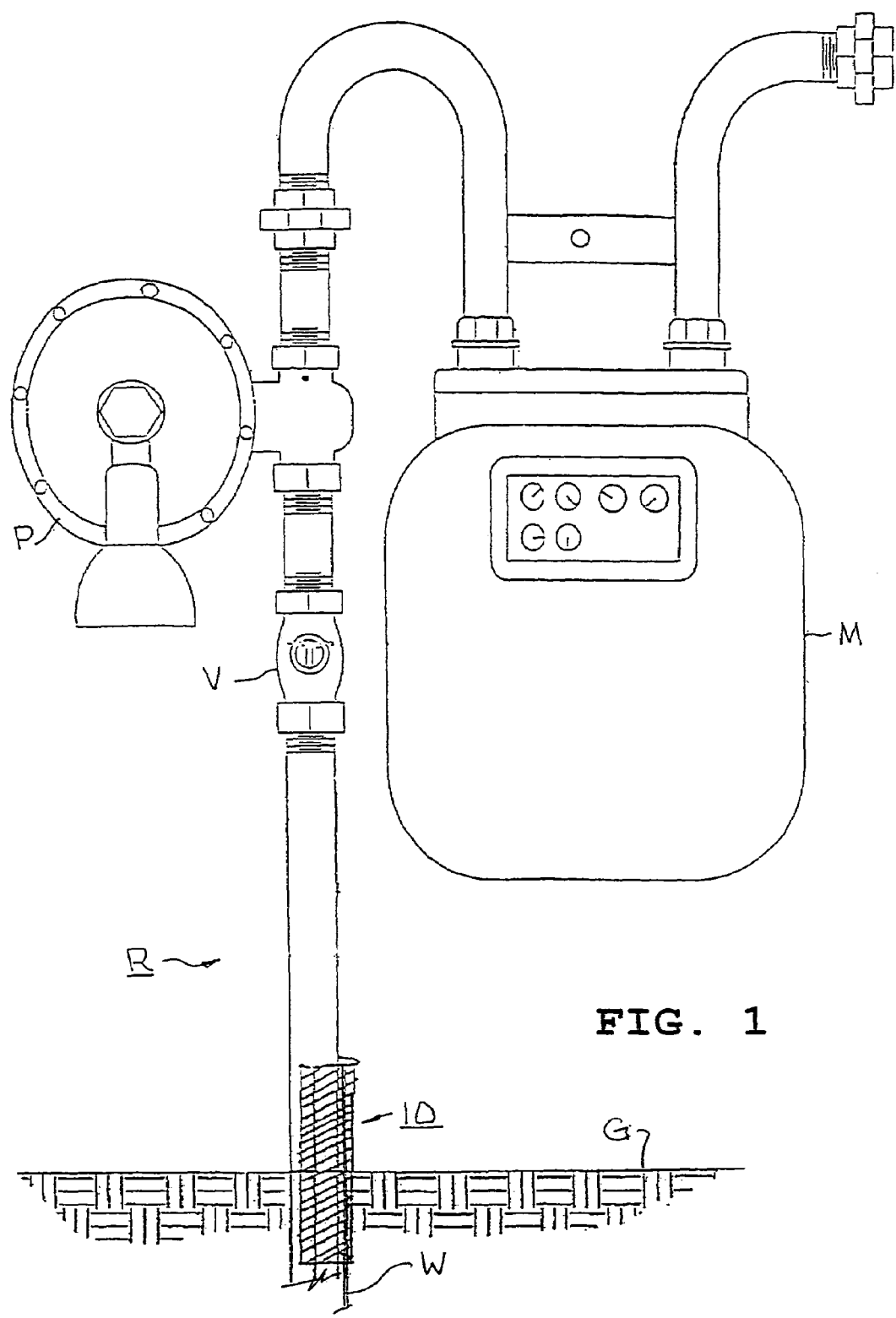
FIG. 1 is an elevation view illustrating the tracer wire snap clamp used in a gas meter riser application.
Figure 2:
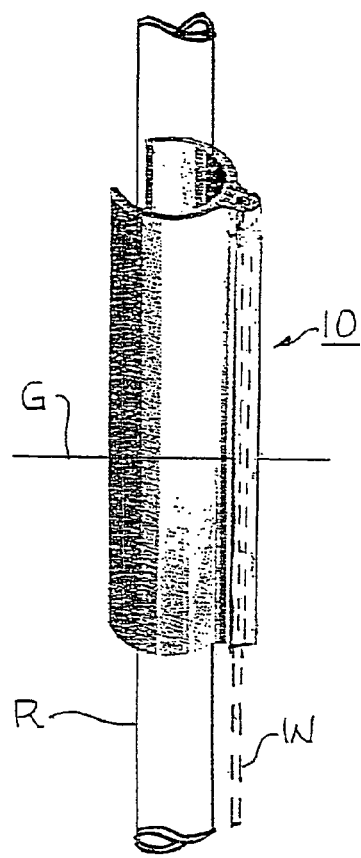
FIG. 2 is a perspective view illustrating a preferred embodiment of the snap clamp mounting a tracer wire on a riser.

Turning first to FIG. 1, the use of the tracer wire snap clamp 10 in association with the riser R of a typical gas meter M installation is shown. As shown, the riser R extends from the ground G through a valve V past a pressure regulator P to the inlet of the meter M. In known installations, the tracer wire W extends upwardly beyond ground level to a completely above ground clamp or tie point selected by the installer (not shown). Thus, the tracer wire W is exposed to observation and contact above ground level. As shown, the present tracer wire snap clamp 10 extends from a point below ground level G to a point above ground level G. As can best be seen in FIG. 2, the above ground portion of the tracer wire W is completely encased in the clamp 10.

Figure 3:
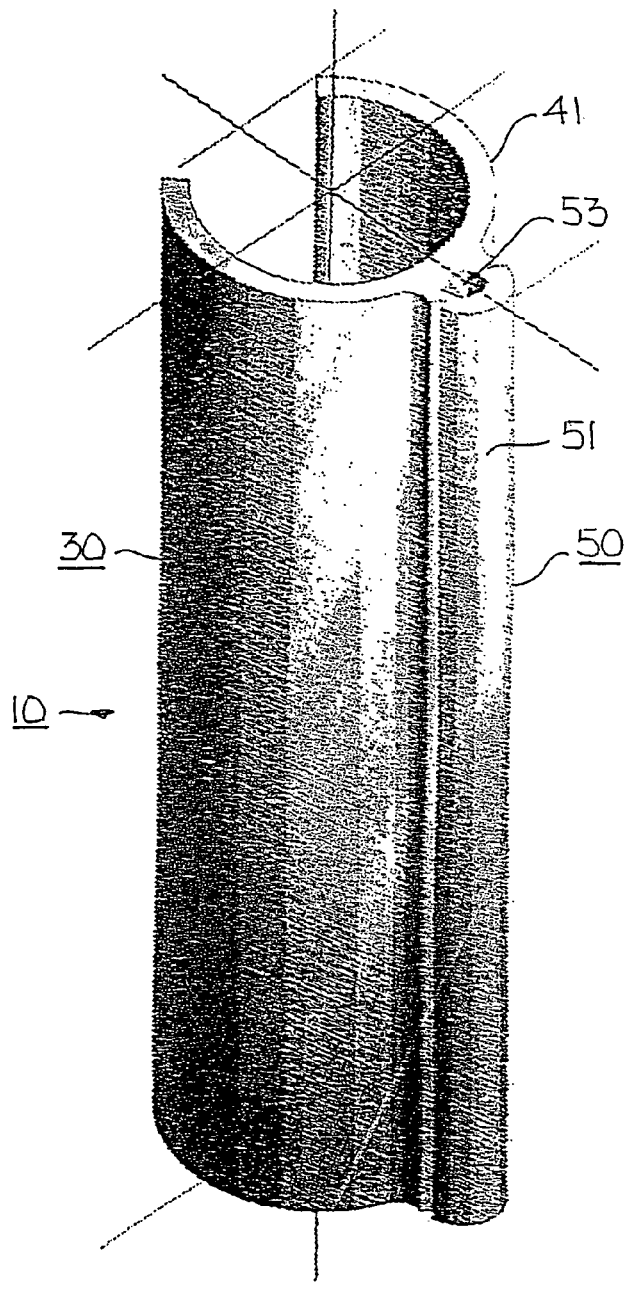
FIG. 3 is a perspective view of the preferred embodiment of the snap clamp illustrated in FIG. 2.
Figure 4:
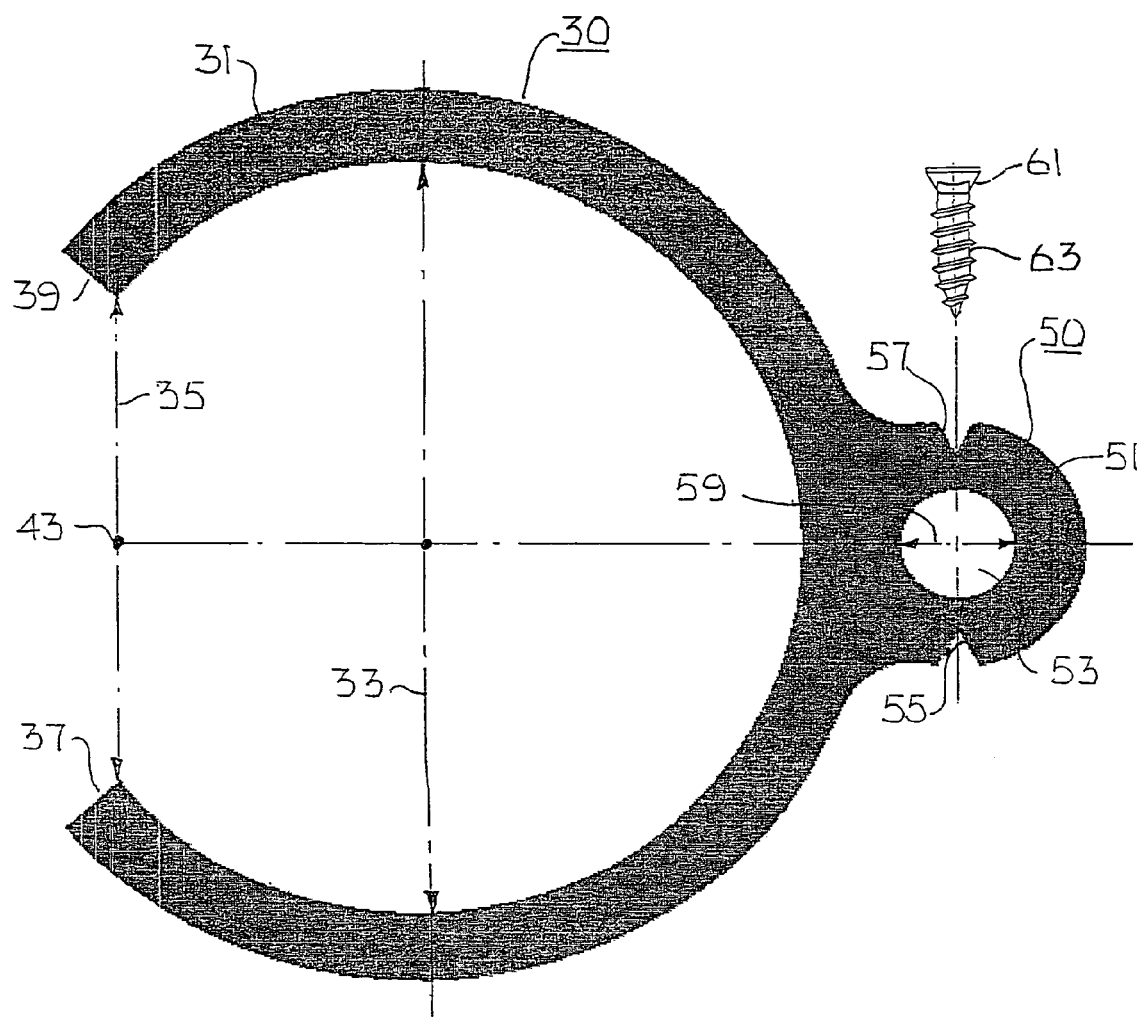
FIG. 4 is a top plan view of the clamp of FIG. 3.

As is best seen in FIGS. 3 and 4, the clamp 10 consists essentially of a riser gripping component 30 and a tracer wire gripping component 50. The riser gripping component 30 is an elongated tubular member having a circular C-shaped cross section 31. The inside diameter 33 of the cross-section 31 is substantially equal to the outer diameter of the riser R and the opening 35 of the cross-section 31 is less than the outer diameter of the riser R. The clamp material is sufficiently flexibly resilient so that, when the edges 37 and 39 of the riser gripping component 30 are pressed against the riser R, the component 30 resiliently flexes to snap around the riser R and snugly grip it. The tracer wire gripping component 50 is located longitudinally on the outside wall 41 of the riser gripping component 30, preferably diagonally opposite the longitudinal center 43 of the opening 35 in the riser gripping component 30. As shown, the tracer wire gripping component 50 is a smooth bore tubular conduit 51 for receiving the tracer wire 10. As shown, the bore 53 extends for the entire length of the clamp 10 and a pair of diametrically opposite V-shaped grooves 55 and 57 extend along the length of the conduit 51. The inner diameter 59 of the conduit 51 is greater than the outer diameter of the tracer wire W. One or more tap screws 61 are provided having tips adapted to be received in the V-shaped grooves 55 and 57 and having a threaded body diameter 63 suitable for engagement in the bore 53 of the tubular conduit 51.

In installing the tracer wire snap clamp 10 in a given application, a clamp 10 having the desired riser diameter is selected in a desired length. For example, clamps sized for ¾", 1" and 1¼" pipes would be typical selections in desired lengths of 6, 12 or 18". With the earth removed around the riser R and the tracer wire W, the tracer wire W is inserted into the bore 53. Preferably, the tracer wire W will be inserted at the lower end of the bore 53 until it extends beyond the upper end of the bore 53 and can be bent over the upper end of the bore 53. However, it is only necessary that the tracer wire W extend within the bore 53. With the tracer wire W thus inserted, one or more of the tapping screws 61 can be seated in either of the V-shaped grooves 55 and 57 and tightened toward the center of the bore 53, locking the tracer wire W between the tapping screw 61 and the opposite wall of the conduit 51. If the wire W extends through the upper end of the bore 53, a tapping screw 61 may be tightened downwardly into the bore 53 so that the threads of the screw 61 lock the wire W against the wall of the conduit 51 while the tapping screw 61 seals or closes the upper end of the bore 53. The exposed end of the wire W can then be cut off. Preferably, the tracer wire W is stripped at the area of contact with the tap screw 61 so that electrical contact with the tracer wire W can be accomplished by contacting the screw 61. Even if the tracer wire W does not extend all the way to the upper end of the bore 53, a tapping screw 61 may be downwardly tightened into the bore 53 to reduce the possibility of moisture passing downwardly into the conduit 51 and into contact with the tracer wire W. With the tracer wire W thus installed in the clamp 10, the riser gripping component 30 is snapped onto the riser R with the upper half of the clamp 10 extending above ground G and the lower half of the clamp 10 extending below ground G. The earth can then be backfilled around the pipe R and clamp 10 to complete the installation.

Preferably, the clamp 10 is constructed of a high density thermoplastic extruded material such as acrylic/PVC thermoplastic and will have an ultraviolet stabilized permanent gray color. A bore of 0.218 inches will accommodate tracer wires in a range of 10 to 12 gauge, but the bore diameter can be made of larger size to accommodate heavier gauge wire. The high density thermoplastic is highly impact resistant, fire retardant and self-extinguishing. It is flexible and resistant to chipping and cracking, thus allowing a clamp that can be installed in dirt, concrete or paving. The gray color allows the clamp to become a part of the application setting reducing the likelihood of detection by innocent or perhaps not so innocent observers.

A prototype device suited to 1¼" outer diameter riser pipe has a 1.3" inner diameter riser gripping section with a 0.836" opening for receiving the riser into the clamp. The outer diameter of the riser gripping section was 1.55 inches. The bore was 0.218" in diameter and the walls of the tube, like the walls of the riser gripping portion, were 0.25" thick. The screw tap grooves were located diametrically opposite the longitudinal plane of symmetry of the clamp and were 0.069" at their opening and extended for a depth of 0.06".

While it is preferred that the tubular portion of the clamp be diametrically opposite the opening in the clamp, the tubular portion could be disposed longitudinally along any portion of the clamp wall. While diametrically opposite V-grooves are preferred, a single V-groove aligned anywhere radially in the outer surface of the tube could be used.

Thus, it is apparent that there has been provided, in accordance with the invention, a tracer wire snap clamp that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A clamp for attaching a pipeline tracer wire to a pipeline riser comprising an elongated riser gripping member having a C-shaped circular cross-section, said cross-section having a diameter not less than an outer diameter of the riser and having a perimeter extending more than 180 degrees to a cordal opening of length less than the outer diameter of the riser, said gripping member being resiliently flexible for snapping onto the riser, an elongated tubular member having a bore of circular cross-section, said tubular member extending integrally along an outer wall of said riser gripping member and having a V-shaped groove extending along a length thereof, said bore having a diameter greater than an outer diameter of the tracer wire for receiving the tracer wire therein.

2. A clamp for attaching a pipeline tracer wire to a pipeline riser comprising a first member having a C-shaped wall defining a longitudinal slot and an inner surface of circular cross section, said inner surface of circular cross-section extending from one side of said slot to another side of said slot along an entire length of said first member, said member being flexibly resilient to permit expansion and contraction of said slot for snapping said member snugly onto and releasing said member from the riser, and a second member extending from an outer surface of said first member and having a longitudinal bore of endless circular cross-section parallel to said longitudinal slot for receiving the tracer wire therein.

3. A clamp according to claim 2, said inner surface being sufficiently smooth as to permit said surface to abut without penetrating an outer surface of the riser.

4. A clamp according to claim 2, said second member being aligned on said first member diametrically opposite said slot.

5. A clamp according to claim 2 made of non-metallic material.

6. A clamp according to claim 2 made of high density thermoplastic material.

7. A clamp according to claim 2 made of fire-retardant material.

8. A clamp according to claim 2, said longitudinal bore having a constant diameter therethrough.

9. A clamp for attaching a pipeline tracer wire to a pipeline riser comprising a first member having a C-shaped wall defining a longitudinal slot and an inner surface of circular cross section, said inner surface of circular cross-section extending from one side of said slot to another side of said slot along an entire length of said first member, said member being flexibly resilient to permit expansion and contraction of said slot for snapping said member snugly onto and releasing said member from the riser, and a second member extending from an outer surface of said first member and having a longitudinal bore parallel to said longitudinal slot for receiving the tracer wire therein, said bore and said inner surface of said first member being non-intersecting.

10. A clamp according to claim 9, said inner surface being sufficiently smooth as to permit said surface to abut without penetrating an outer surface of the riser.

11. A clamp according to claim 9, said second member being aligned on said first member diametrically opposite said slot.

12. A clamp according to claim 9 made of non-metallic material.

13. A clamp according to claim 9 made of high density thermoplastic material.

14. A clamp according to claim 9 made of fire-retardant material.

15. A clamp according to claim 9, said longitudinal bore having a constant diameter therethrough.

16. For attaching a pipeline tracer wire to a pipeline riser using a clamp having a first member flexibly resilient for snapping snugly onto the riser and a second member extending from an outer surface of the first member with a longitudinal bore for receiving the tracer wire therein, a method comprising the steps of:

inserting the tracer wire into the bore;

snapping the first member onto the riser with an upper portion of the clamp extending above a ground level and a lower portion of the clamp below a ground level at the riser; and backfilling earth around the lower portion of the clamp.

17. A method according to claim 16, said inserting step comprising the sub-steps of:

inserting the tracer wire into a lower end and through an upper end of the bore; and bending the tracer wire over the upper end of the bore.

18. A method according to claim 16, said inserting step comprising the sub-steps of:

inserting the tracer wire into a lower end of the bore; and locking the tracer wire in the bore with a tapping screw.

\* \* \* \* \*